May 19, 1925. 1,538,694
E. C. GLEDHILL
TRUCK TURNING APPARATUS
Filed March 12, 1924 2 Sheets-Sheet 1
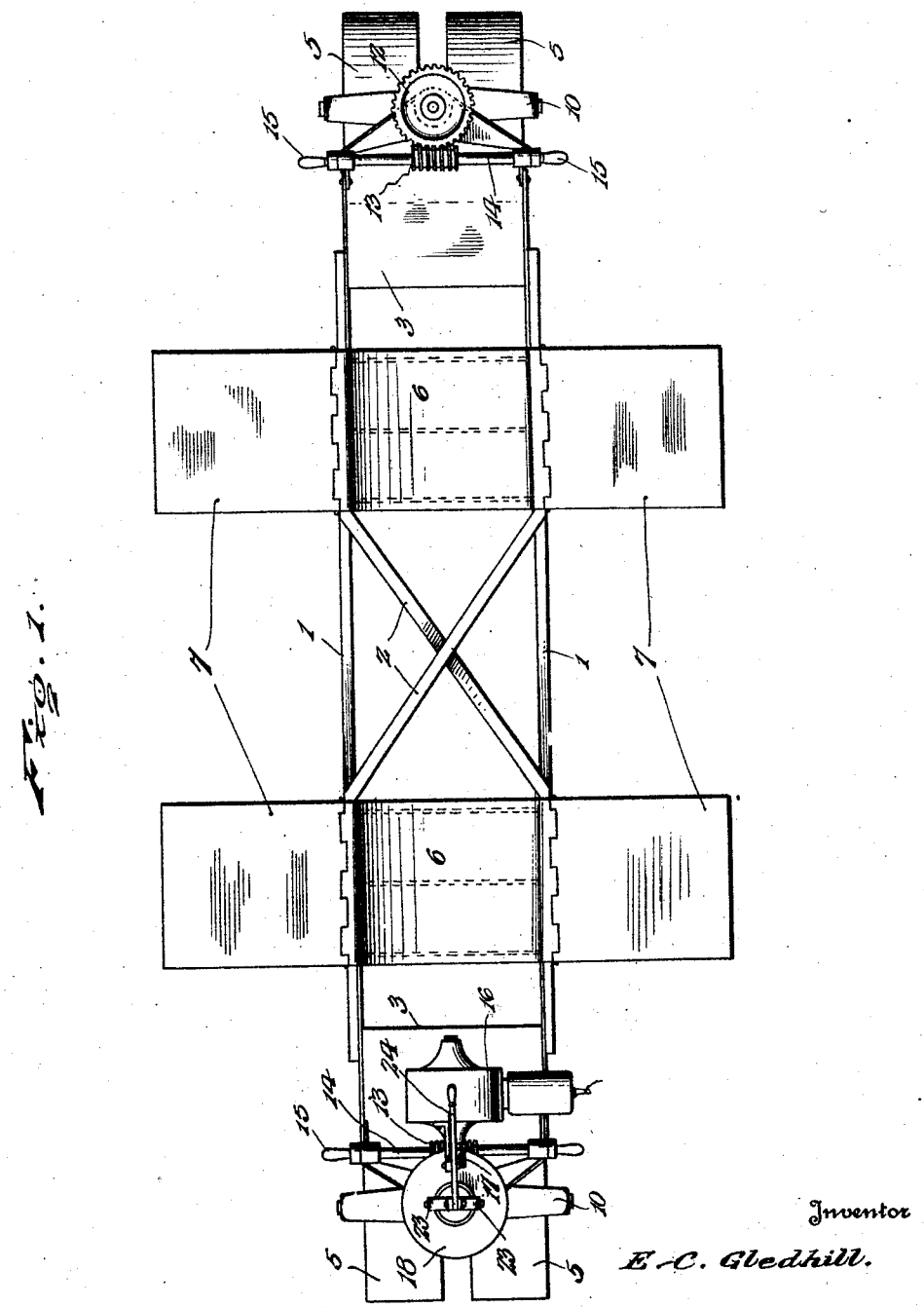

May 19, 1925. 1,538,694
E. C. GLEDHILL
TRUCK TURNING APPARATUS
Filed March 12, 1924 2 Sheets-Sheet 2
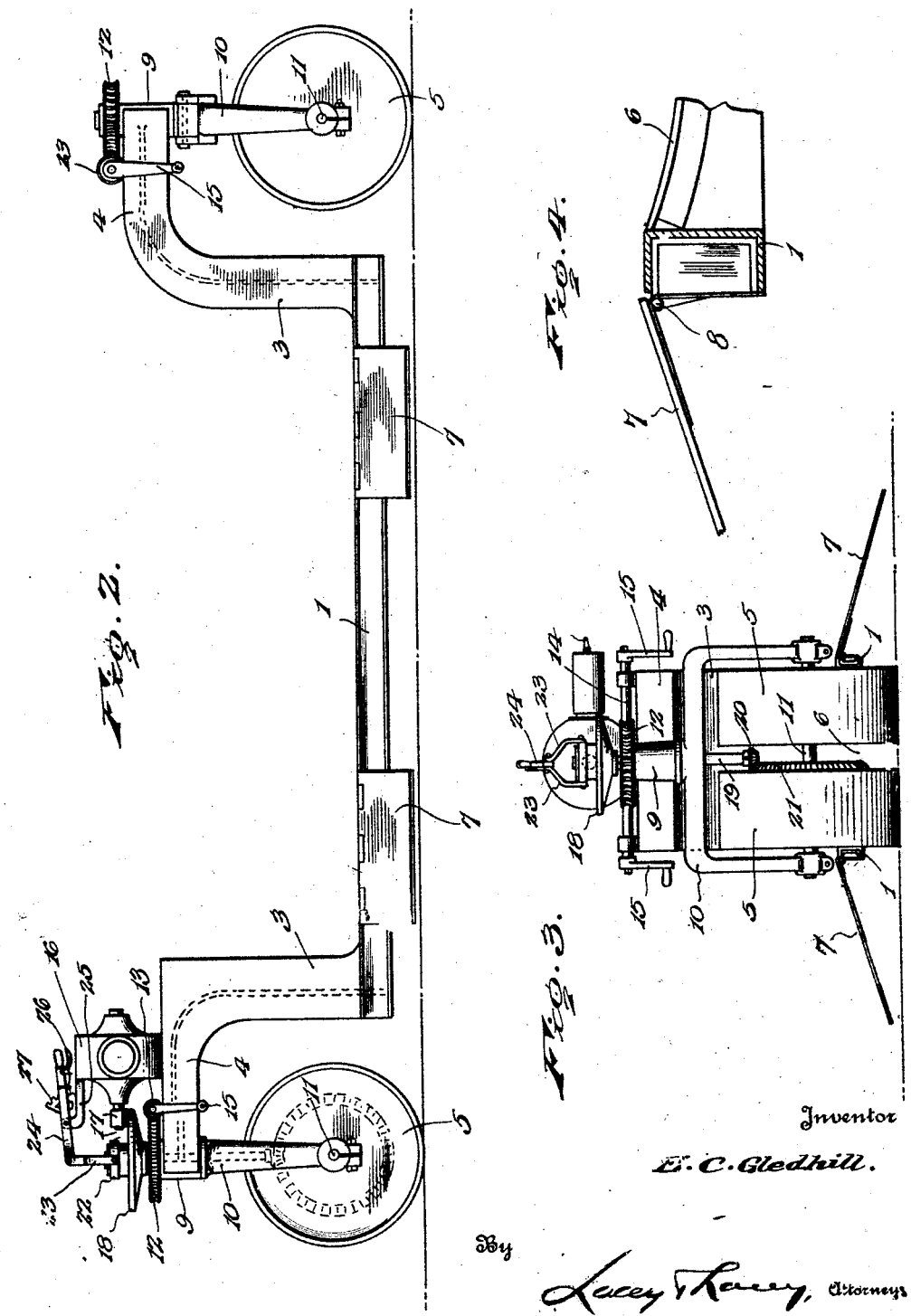
Inventor
E. C. Gledhill.
By Lacey & Lacey, Attorneys Patented May 19, 1925.

1,538,694

UNITED STATES PATENT OFFICE.

EDWARD C. GLEDHILL, OF GALION, OHIO.

TRUCK-TURNING APPARATUS.

Application filed March 12, 1924. Serial No. 698,696.

*To all whom it may concern:*

Be it known that I, EDWARD C. GLEDHILL, a citizen of the United States, residing at Galion, in the county of Crawford and State of Ohio, have invented certain new and useful Improvements in Truck-Turning Apparatus, of which the following is a specification.

My present invention is a machine intended more particularly for use in repairing roadways. In the operation of repairing roadways, the material to be placed upon the roadbed is hauled to the point of use in trucks which are generally motor trucks of considerable capacity. To dump the material upon the road at the point of use, it is necessary to reverse the truck so that it may be backed to a point adjacent the finished roadbed to dump its load where it may be conveniently spread and joined to the finished road, after which the truck is drawn forward and may be returned to the point of supply to obtain another load. The operation of turning a truck so as to reverse its position is time-consuming when the truck is drawn under its own power and is frequently a matter of some difficulty, inasmuch as the truck cannot be turned as though swinging about a pivot but must be run back and forth through very short distances until it eventually reaches the desired position. It is the object of my present invention to provide a simple and easily operated machine whereby the operation of reversing or turning a loaded truck may be very easily and expeditiously performed, and to that end the invention consists, broadly stated, in a wheel-supported platform or frame onto which the front wheels of the hauling truck may be driven and the said platform or frame then operated under power mounted thereon to swing the hauling truck about its rear wheels pivotally so that it will be quickly reversed and brought into position to dump its load. One embodiment of my invention is illustrated in the accompanying drawings and will be hereinafter fully set forth.

In the drawings:

Figure 1 is a plan view of an apparatus constructed in accordance with my invention;

Fig. 2 is a side view of the same;

Fig. 3 is an end elevation, and

Fig. 4 is an enlarged detail transverse section.

In carrying out my invention, I employ a pair of sills 1 which are preferably channel bars and arranged in parallelism. At about their centers, these sills are connected by braces 2 so that their relative positions will be maintained and at the ends of these sills I secure pedestals 3 which have their upper ends turned outwardly, as shown at 4, in alinement with the sills 1 to be connected with the ground wheels 5 and support means for shifting said wheels to effect steering of the device. Adjacent the ends of the sills 1, I secure to and between the same the transverse platforms 6 which are preferably dipped or concave in their upper surfaces so that, when the steering wheels of the hauling truck are driven onto these platforms, they will be firmly seated and the tendency of the wheels to pass from the platforms will be counteracted. To the outer sides of the sills and alined transversely with the said platforms are skids or runways 7 which are connected to the sides of the sill by spring hinges 8 whereby they will be normally supported with their outer free edges above the surface of the road, permitting the operator to effect travel of the device over the road without causing the said runways to cut into the surface and injure the same. The free edges of the runways will, however, be normally disposed close enough to the ground to permit the front wheels of the hauling truck to readily enter upon the runways when the device is to be used, this position of the runways being effected by properly proportioning the tension of the springs in the hinges 8 with the weight of the respective runways.

At the center of each outturned head portion 4 of each pedestal 3 is a hub or bearing member 9 which receives a hollow stem rising centrally from a yoke 10, an axle 11 being journaled in the lower ends of each yoke and having the ground wheels 5 secured thereon. At the upper end of each stem is secured a worm gear 12 with which meshes a worm 13 fixed upon a worm shaft 14 which is disposed transversely upon the head 4 of the pedestal and is equipped at its ends with cranks or other handles 15. It will thus be readily seen that by rotating the said shafts the yoke will be turned so as to dispose the ground wheels at an angle to the sills 1 and thereby cause the apparatus to travel in an arcuate path.

Upon one of the heads 4, I mount a motor 16 which may be an internal combustion engine or may be an electric motor when a convenient source of electric power is available. Upon the shaft of this motor, at its outer end, is carried a friction pinion 17 which is adapted to cooperate with a friction gear 18 splined upon a vertical shaft 19 extending through the hollow stem of the yoke 10, and provided at its lower end with a beveled pinion 20 meshing with a beveled gear 21 secured upon the inner side of one of the adjacent ground wheels 5. The hub of the friction gear 18 is swiveled within a collar 22 carried by the lower ends of links 23 which are suspended upon the outer end of a hand lever 24. The lever 24 may be fulcrumed upon a bracket 25 projecting from the housing of the motor, and it is equipped with a latch 26 engaging with a segment 27 upon the bracket whereby the lever may be held in a set position. By raising the lever, the friction gear 18 will obviously be lowered from contact with the friction pinion 17 and no power will be transmitted to the ground wheels but, if the lever be swung downwardly, the friction gear will obviously be lifted into contact with the friction pinion and the shaft 19 will consequently be rotated so that the ground wheels will be positively driven and the apparatus caused to travel over the ground.

In using the apparatus, the loaded hauling truck is driven up the runways 7 so that its front steering wheels will ride onto and rest upon the platforms 6. The ground wheels 5 are then adjusted so that they will be disposed upon an arc described about the center of the rear axle of the hauling truck, after which the motor 16 is started and the device will then be caused to move over the road in an arcuate path about the center of the rear axle of the hauling truck. The front end of the truck will, of course, follow the movement of the turning apparatus and the rear wheels of the truck will merely accommodate the pivotal movement of the hauling truck. The movement is continued through one-half of a circle and thereby reverses the hauling truck so that its rear end will be presented to the repaired portion of the road and the truck may then be dumped in the usual manner to deposit its load. After the load is dumped, the truck is driven off under its own power and its rear wheels will be caused to cross the turning truck which will be left upon the road in position to receive and turn a succeeding truck.

It will be readily noted that I have produced an exceedingly simple apparatus whereby a hauling truck may be very quickly reversed so as to dump its load at a desired point and then driven off. At the end of each operation, my truck-turning apparatus will have reached a point in the road distant from the point occupied at the start of the operation equal to twice the length of the truck which was turned, so that it serves as a marker to enable the operator of the hauling truck to easily determine when he has reached the proper point for dumping his load, and the reversing of the hauling truck is accomplished more expeditiously than was heretofore possible without using any of the power of the hauling truck and, consequently, with a saving of the fuel provided for the latter. When the operations have been finished or temporarily suspended, my improved turning device may be driven under its own power to a shed or storehouse so as to be protected from the weather, and it will be noted that the device is exceedingly simple in the construction and arrangement of its parts so that it may be produced at a low cost and is not apt to get out of order.

Having thus described the invention, I claim:

1. An apparatus for reversing a hauling truck comprising a wheel-supported frame, means for effecting travel of the frame, means for steering the frame during its travel, dished transverse platforms upon the frame to receive and hold the front wheels of a hauling truck, and runways carried upon the frame in alinement with the platforms and extending laterally from the frame.

2. In an apparatus for reversing a hauling truck, a wheel-supported frame, dished platforms secured transversely upon the frame to receive and hold the front wheels of a hauling truck, and laterally extending runways yieldably secured upon the sides of the frame in alinement with the respective platforms.

3. In an apparatus for reversing a hauling truck, a frame constructed to receive and support the front wheels of a hauling truck, pedestals at the ends of the said frame, ground wheels mounted in said pedestals, the pedestals clearing the wheels, means upon the pedestals for angularly adjusting the wheels to effect steering of the frame, and means mounted upon one of the pedestals for rotating said wheels to thereby effect travel of the frame.

4. In an apparatus for reversing a hauling truck, the combination of a frame constructed to receive and support the front wheels of a hauling truck, ground wheels mounted in the ends of the frame, the ends of the frame overhanging and clearing the wheels, means upon the frame for angularly adjusting the said wheels whereby to effect steering of the frame, a vertically disposed shaft mounted upon one end of the frame and operatively connected with one of the said ground wheels to effect rotation thereof, a motor upon said end of the frame, and means for operatively connecting said motor with said vertical shaft.

5. In an apparatus for the purpose set forth, the combination of a frame constructed to receive and support the wheels of a hauling truck, ground wheels mounted in the ends of the frame, means for angularly shifting said wheels to effect steering of the frame, a vertically disposed shaft mounted in one end of the frame and operatively connected to one of the adjacent ground wheels, a friction gear slidably mounted upon the upper end of said shaft and constrained to rotate therewith, a motor upon the frame adjacent said shaft, a friction pinion on the motor shaft, means for shifting the friction gear into and out of contact with the friction pinion, and means for locking the last-mentioned means in a set position.

6. An apparatus for reversing a hauling truck comprising a frame constructed to receive and hold the front wheels of a truck with the rear wheels of the truck resting on the ground, supporting wheels mounted in the ends of the frame with the ends of the frame overhanging and clearing the wheels, means on the frame for rotating the supporting wheels, and means on the frame for angularly adjusting the supporting wheels whereby the frame may be driven over an arcuate path of short radius to move the hauling truck pivotally about its own rear wheels.

In testimony whereof I affix my signature.

EDWARD C. GLEDHILL. [L. S.]